United States Patent
Yoshida

(10) Patent No.: US 7,327,843 B2
(45) Date of Patent: Feb. 5, 2008

(54) DATA REPRODUCING DEVICE, HARD DISK, AND DATA STORING DISK

(75) Inventor: Shinji Yoshida, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 562 days.

(21) Appl. No.: 09/994,929

(22) Filed: Nov. 28, 2001

(65) Prior Publication Data

US 2002/0063986 A1 May 30, 2002

(30) Foreign Application Priority Data

Nov. 28, 2000 (JP) .................. 2000-008430 U
Feb. 19, 2001 (JP) .................. P 2001-042112

(51) Int. Cl.
- H04N 7/167 (2006.01)
- G06F 11/30 (2006.01)
- G06F 12/14 (2006.01)
- H04L 9/32 (2006.01)
- G11B 5/09 (2006.01)
- G11B 20/10 (2006.01)
- G11B 20/12 (2006.01)
- H04N 5/76 (2006.01)
- H04N 7/16 (2006.01)
- G06F 11/00 (2006.01)
- G06F 12/16 (2006.01)

(52) U.S. Cl. .............. 380/201; 713/189; 713/193; 380/203; 380/228; 380/229; 380/242; 369/275.3; 369/275.4; 369/59.14; 369/59.13; 726/32; 726/33

(58) Field of Classification Search ........... 713/189, 713/200, 193; 380/200, 201, 203, 228, 229, 380/242; 369/275.3, 275.4, 59.14, 59.13; 726/32, 33

See application file for complete search history.

(56) References Cited

U.S. PATENT DOCUMENTS 6,668,324 B1 * 12/2003 Mangold et al. ........... 713/189
6,678,236 B1 * 1/2004 Ueki ....................... 369/275.3

FOREIGN PATENT DOCUMENTS

JP 10-143443 5/1998

OTHER PUBLICATIONS

"5C" group, "5C Digital Transmission Content Protection White Paper", Jul. 14, 1998, Revision 1.0.*
http://www.pctechguide.com/10dvd_Content_protection.htm.*

* cited by examiner

Primary Examiner—Christopher Revak
Assistant Examiner—Shin-Hon Chen
(74) Attorney, Agent, or Firm—Morgan, Lewis & Bockius LLP

(57) ABSTRACT

A hard disk A has is constructed to include: a disk 10 in which copy protection information is written in advance in a surface shape such as slits or corrugations in a prerecording region 13 over a substrate 11 other than a data storage region 12; a pickup unit 20 for reading the copy protection information on the disk 10; and a copy protect unit 42 made operative, when it copies the encrypted data over the data storage region 12 of the disk 10 in response to the demand of the external device B: to perform an authentication with reference to the copy protection information read by the pickup unit 20; and to output the information on the secret key, as contained in the copy protection information, to the external device B which has been recognized to be correct by that authentication.

17 Claims, 2 Drawing Sheets

DATA REPRODUCING DEVICE, HARD DISK, AND DATA STORING DISK

BACKGROUND OF THE INVENTION

1. Technical Field

The present invention relates to a data reproducing device, a hard disk and a data storing disk having a function to prevent an unlawful copy mainly. The present invention further relates to a data reproducing device, a hard disk and a data storing disk capable of realizing a user-friendly function at a reasonable price.

2. Related Art

In the analog interface of an AV device, there have been taken various measures for preventing unlawful copies. In the digital interface including the IEEE1394 for transmitting video or audio works, too, similar measures have been taken by using the 5C-DTCP (SC Digital Transmission Content Protection system, as will be briefly referred to as the "DTCP").

In the hard disk conforming to the DTCP system, for example, the unlawful copy is prevented by the method by which encrypted data over a disk are copied in response to a demand from an external device and by which the information on the decoding key is given only to the external device recognized to be correct through an authentication. The copy protection information such as an authentication, key or cipher system is recorded in advance in the memory in the hard disk.

Here in the Unexamined Japanese Patent Application Publication No. Hei10-143443, there is disclosed the construction of a hard disk, the security of which is enhanced by using the data of a prepared password.

[Problems to be Solved]

In the case of the prior art, however, the memory having the copy protection information recorded in advance is directly connected with the bus line or the like. If this bus line is externally controlled, the key information or the like may be unlawfully stolen. If this key information or the like is stolen, the encrypted data can be decoded to perform the unlawful copy. A similar problem is pointed out not only for the hard disk but also for a data reproducing device for reproducing a data storing disk such as the CD or DVD.

Where the data reproducing device for the DVD or the like is to be made user-friendly, it is ordinarily necessary to purchase and customize a matching application software. However, there has been pointed out a problem that not only the software but also an external memory is required to raise the cost. A similar problem also arises when a personal computer is to be made user-friendly.

SUMMARY OF THE INVENTION

The present invention has been conceived under the circumstances thus far described and has a main object to provide a data reproducing device, a hard disk and a data storing disk, which have been improved to make the copy protection information or the like hard to steal. Another object is to provide a data reproducing device, a hard disk and a data storing disk, which can realize the user-friendly function at a reasonable price.

[Means for Solving the Problems]

According to the present invention, there is provided a data reproducing device for reproducing data recorded in a data storing disk, comprising: a pickup unit for reading the copy protection information which has been written in advance as the surface shape such as slits or corrugations in the region over the substrate of the data storing disk other than a data storage region; and a copy protection unit adapted, when it copies the encrypted data over the data storage region of the data storing disk in response to a demand of an external device, to perform an authentication with reference to the copy protection information read by the pickup unit thereby to output the information, as contained in the copy protection information and relating to a secret key, to the external device which has been recognized to be correct through the authentication.

According to the present invention, there is provided a hard disk comprising: a disk having the copy protection information written in advance as the surface shape such as slits or corrugations in a pre-recording region over a substrate other than a data storage region; a pickup unit for reading the copy protection information over the disk; and a copy protection unit adapted, when it copies the encrypted data over the data storage region of the data storing disk in response to a demand of an external device, to perform an authentication with reference to the copy protection information read by the pickup unit thereby to output the information, as contained in the copy protection information and relating to a secret key, to the external device which has been recognized to be correct through the authentication.

According to the present invention, there is provided a data storing disk having secret information written in advance as the surface shape such as slits or corrugations in the region over a substrate other than a data storage region. The secret information may be exemplified by a copy protection information.

According to the present invention, there is provided another data reproducing device for reproducing data recorded in a data storing disk, comprising: a magnetic head for reading the program which has been magnetically recorded in advance in the region over the substrate of a data storing disk other than a data storage region; and a reproduce control unit for reproducing the program recorded in the region, through the magnetic head at the time of reproducing the data from the region over the substrate of the data storing disk other than the data storage region.

More preferably, it is desired that the reproduce control unit is desirably replaced by a reproduce/record control unit for reproducing the program recorded in the region, through the magnetic head at the time of reproducing the data from the region over the substrate of the data storing disk other than the data storage region, and for recording a program or data in the region through the magnetic head at a data recording time.

According to the present invention, there is provided another hard disk comprising: a disk having a program magnetically recorded in advance in the region over a substrate other than a data storage region; a magnetic head for reading the program which has been recorded in the region over the disk; and a reproduce control unit for reproducing the program recorded in the region, through the magnetic head at the time of reproducing the data from the region over the substrate of the disk other than the data storage region.

More preferably, it is desired that the reproduce control unit is replaced by a reproduce/record control unit for reproducing the program recorded in the region, through the magnetic head at the time of reproducing the data from the region over the substrate of the data storing disk other than the data storage region, and for recording a program or data in the region through the magnetic head at a data recording time.

According to the present invention, there is provided another data storing disk having a program magnetically recorded in the region over a substrate other than a data storage region.

More preferably, it is desired that a program or data can be magnetically recorded/reproduced in/from the region over the substrate other than the data storage region.

BRIEF DESCRIPTION OF THE DRAWINGS

FIG. 1 is a diagram for explaining an embodiment of the present invention and a block diagram of a hard disk.

FIG. 2 is a schematic front elevation of a disk in the same hard disk.

FIG. 3 is a diagram for explaining another embodiment of the present invention and a block diagram of a hard disk.

FIG. 4 is a schematic front elevation of a disk in the same hard disk.

DETAILED DESCRIPTION OF THE PREFERRED EMBODIMENTS

[Embodiments of the Invention]

Figure 1:
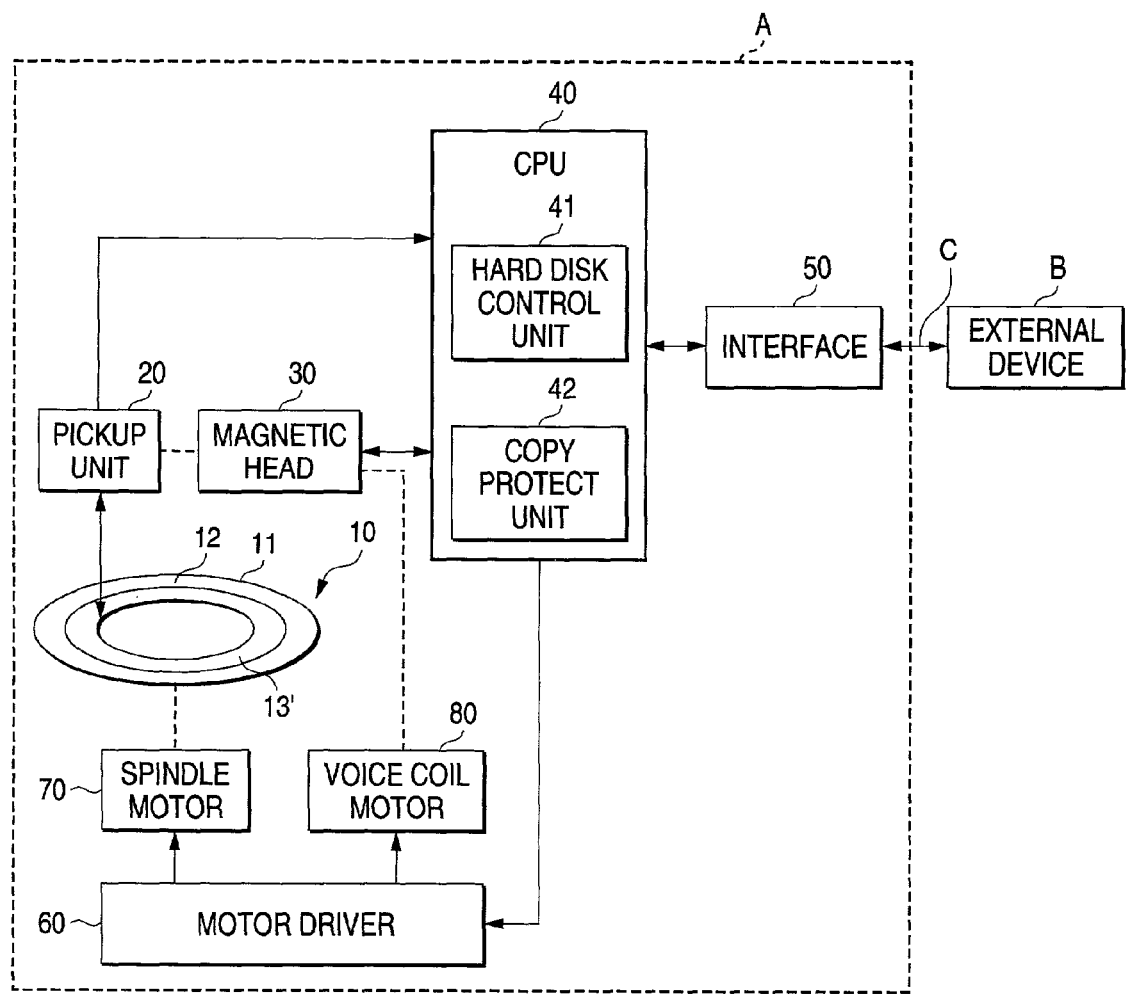
[FIG. 1]
Figure 2:
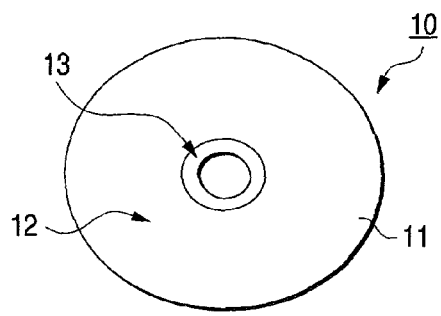
[FIG. 2]

The embodiments of the present invention will be described with reference to the accompanying drawings. FIG. 1 is a block diagram of a hard disk, and FIG. 2 is a schematic front elevation of a disk in the hard disk.

A hard disk A to be exemplified is used for an AV device and adopts the DTCP system as a measure for preventing an unlawful copy. The hard disk A is connected with an external device B such as a computer via a bus line C.

The hard disk A has such a fundamental construction as to include: a disk 10 in which copy protection information is written in advance in a surface shape such as slits or corrugations in a pre-recording region 13 over a substrate 11 other than a data storage region 12; a pickup unit 20 for reading the copy protection information on the disk 10; a magnetic head 30 for reading out the data recorded in the data storage region 12 of the disk 10; a spindle motor 70 for turning the disk 10; a voice coil motor 80 for moving the magnetic head 30; and a CPU 40 for controlling the hard disk A as a whole. The CPU 40 is caused to exhibit the functions as a hard disk control unit 41 and a copy protect unit 42 by processing the program recorded in the not-shown memory.

Here, the disk 10 is exemplified by a magnetic disk. This magnetic disk is mostly occupied by the data storage region 12 which is enabled to store the data by a magnetic material, as shown in FIG. 2. Here is disposed the pre-recording region 13 on the inner side of the data storage region 12.

The substrate 11 of the disk 10 is made of such a soft material other than glass or aluminum as is exemplified by plastics. At the stage of making the substrate 11, moreover, the pre-recording region 13 is worked to form slits, holes, corrugations or the like in accordance with predetermined rules. As a result, the copy protection information is written as the surface shape over the pre-recording region 13.

Here, the pickup unit 20 is exemplified by an optical type such as a light emitting diode, light receiving diode and so on and is connected with the voice coil motor 70. Specifically, the pickup unit 20 is so constructed that the pre-recording region 13 over the disk 10 is irradiated with the light from the light emitting diode whereas the light having been reflected or passed through the pre-recording region 13 is received by the light receiving diode and is outputted as electric signals.

The magnetic head 30 is connected with the voice coil motor 80 and is constructed to read the data, as magnetically recorded in the data storage region 12 over the disk 10, thereby to output the data as electric signals.

To the CPU 40, there are inputted the individual data which are read from the magnetic head 30 and the pickup unit 20. Moreover, the CPU 40 is connected with the spindle motor 70 and the voice coil motor 80 through a motor driver 60 and further with the bus line C through an interface 50.

The hard disk control unit 41, as realized by the CPU 40, is fundamentally constructed to activate the spindle motor 70 thereby to turn the disk 10, and to activate, if demanded for copying the data over the disk 10 from the external device B, the voice coil motor 80 in accordance with that demand thereby to convert the data, as inputted as the electric signals from the magnetic head 30, into a predetermined format and to output the converted data to the external device B. When the data demanded for copy by the external device B are encrypted for preventing the unlawful copy, however, the CPU 40 functions as the following copy protect unit 42.

When the copy protect unit 42 copies the encrypted data over the data storage region 12 of the disk 10 in response to the demand of the external device B, its fundamental construction is to perform an authentication with reference to the copy protection information read by the pickup unit 20, and to output the information on the secret key, as contained in the copy protection information, to the external device B which has been recognized to be correct by that authentication. The specific operations will be described in the following.

When a copy of the encrypted data over the disk 10 is demanded from the external device B, the voice coil motor 80 is activated according to the demand, and the data, as outputted from the magnetic head 30, are inputted and converted into the predetermined format without being encoded, so that the converted data are outputted to the external device B. After this, the voice coil motor 80 is activated, in response to a command outputted from the external device B and demanding the authentication, to input the information, as contained in the copy protection information outputted from the pickup unit 20 and relating to the authentication, thereby to execute the authentication with the external device B.

If the authentication results in success, the information, as contained in the copy protection information, on the secret key is outputted to the external device B. If the authentication fails, on the contrary, the information in the copy protection information and on the secret key is not outputted to the external device B. In other words, the external device B cannot decode the secret without the information on the secret key, even if it receives the encrypted data. As a result, it is possible to prevent the unlawful copy.

In the aforementioned case by the hard disk A, the copy protection information is written as the surface shape such as slits or corrugations in the pre-recording region 13 over the disk 10, and the pickup unit 20 for reading the information is not connected directly with the bus line C. As compared with the case of the prior art, therefore, it is less possible that the key information is unlawfully stolen so that the unlawful copy is hard to make in this respect.

Moreover, it is not only possible to omit the memory, as stored with the copy protection information, although needed in the prior art, but also easy to produce the disk 10 massively. In these respects, the cost can be lowered.

The hard disk A thus far described may be modified such that the data such as the program on the copy protection are stored by the magnetic material in the spare portion of the pre-recording region 13 of the disk 10. In this modification, the data can be not only read out by using the magnetic head 30 but also easily rewritten. Therefore, the modification has a merit for a higher performance and for a lower cost.

Here has been described the hard disk, but the present invention can likewise be applied to a data reproducing device for reproducing data recording disks such as the CD or DVD. Specifically, what is structurally different between the hard disk and the data reproducing device of this kind resides only in whether the data storing disc can be freely exchanged. Therefore, the data reproducing device has a construction basically identical to that shown in FIG. 1.

Here, any type could be applied to the data reproducing device and the hard disk according to the present invention, so long as it has the function to prevent the unlawful copy. Nothing is asked for the kind or the like of the disk. Moreover, a system other than the DTCP system could be used as the measure for preventing the unlawful copy. These points are likewise for the data reproducing device.

The data storing disk according to the present invention is not asked for the contents of the secret information or the kinds of the disk, so long as the information is written in advance as the surface shape slits or corrugations in the pre-recording region.

Figure 3:
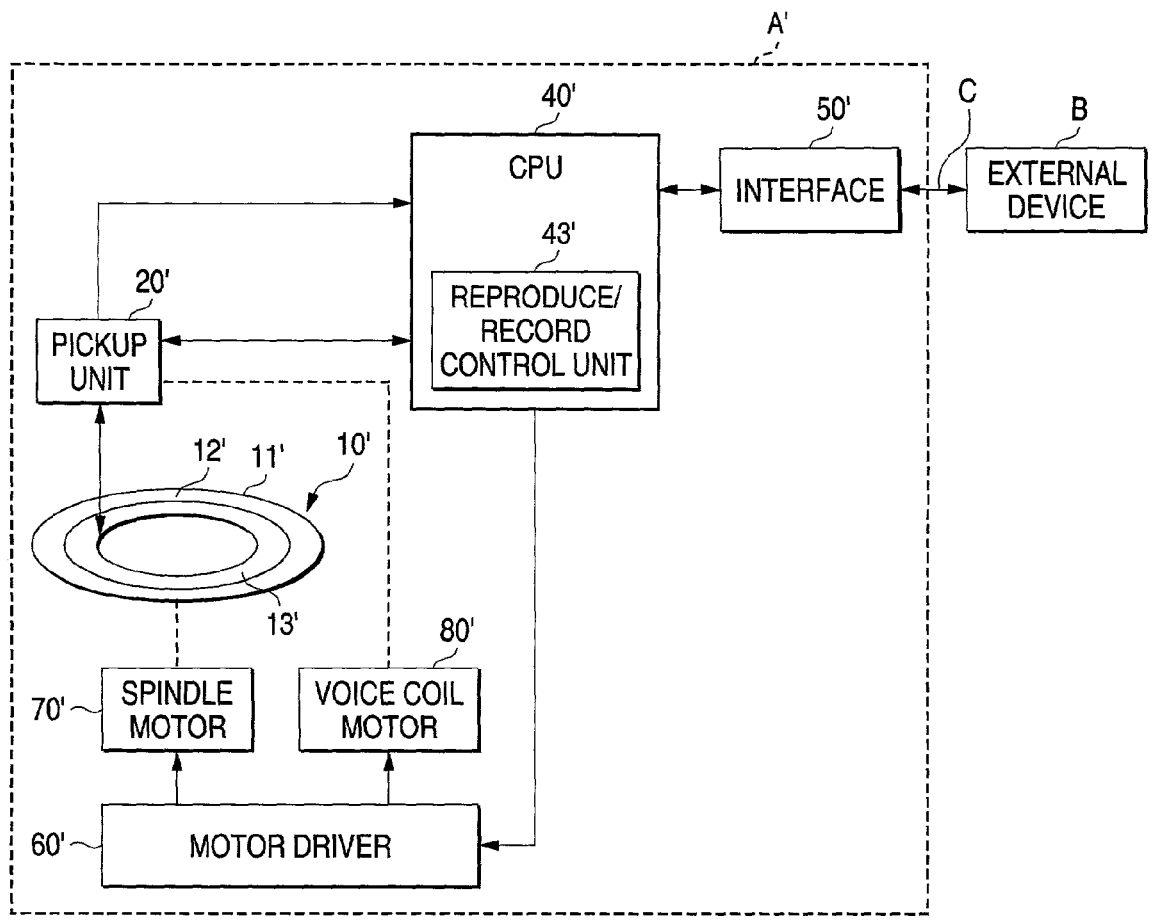
[FIG. 3]
Figure 4:
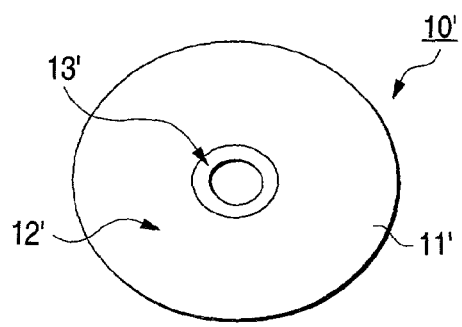
[FIG. 4]

Another embodiment of the present invention will be described with reference to the accompanying drawings. FIG. 3 is a block diagram of a hard disk, and FIG. 4 is a schematic front elevation of a disk in the hard disk. Here, the components similar to those of the foregoing embodiment will be designated by the common reference numerals.

A hard disk A' to be embodied here has such a fundamental construction as to include: a disk 10' in which a program is magnetically recorded in advance in a pre-recording region 13' over a substrate 11' other than a data storage region 12'; a magnetic head 20' for reading out the program or the like recorded in the data storage region 12' and the pre-recording region 13' of the disk 10'; a spindle motor 70 for turning the disk 10'; a voice coil motor 80' for moving the magnetic head 20' from the data storage region 12' to the pre-recording region 13' over the disk 10'; and a CPU 40' for controlling the hard disk A' as a whole. With this hard disk A', there is connected through the bus line C an external device B acting as a computer.

Here, the disk 10' is exemplified by a magnetic disk, and the pre-recording region 13' is disposed on the inner side of the data storage region 12'. The data storage region 12' is defined as the region, in which the user can record/reproduce the data freely in the prior art over the substrate 11'. The pre-recording region 13' is defined as the region which corresponds to the vacant region over the substrate 11' other than the data storage region 12'.

The substrate 11' of the disk 10' is made of such a soft material other than glass or aluminum as is exemplified by plastics. At the stage of making the substrate 11', moreover, the pre-recording region 13' is magnetically stored with the program. By the magnetic head 20', moreover, the program or data can be magnetically recorded/reproduced in/from the pre-recording region 13' of the disk 10'.

With the CPU 40', there is connected the magnetic head 20' through the not-shown signal processing circuit. Moreover, the CPU 40 is connected with the spindle motor 70' and the voice coil motor 80' through a motor driver 60' and further with the bus line C through an interface 50'.

The CPU 40' is caused to exhibit the function as a reproduce/record control unit 43' by processing the program which is recorded in the not-shown memory. Specifically, the reproduce/record control unit 43' is constructed to reproduce the program recorded in the pre-recording region 13' through the magnetic head 20', when an access for the data reproduction is made from the external device B to the pre-recording region 13' of the disk 10', thereby to output the reproduced program to the external device B, and to record the program or data, as sent from the external device B, in the pre-recording region 13' through the magnetic head 20' when an access for the data recording is made.

In the case of the hard disk A' thus constructed, various general-purpose application softwares matching the kind or the like of the external device B can be recorded in advance in the pre-recording region 13' of the disk 10'. For the user, therefore, the user-friendly function can be easily realized by using and customizing such one of the general-purpose application softwares properly as matches the user. Unlike the prior art, it is unnecessary to purchase a software separately and to use any special external memory. This unnecessariness makes the hard disk drastically economical.

Moreover, it is possible to erase the unnecessary one of the various general-purpose application softwares which have been recorded in advance in the pre-recording region 13' of the disk 10'. Therefore, it is possible to record a new program or data in the region or the like, from which the software has been erased. It is naturally possible to reproduce the same program or the like freely. For the user, therefore, the same result is significantly obtained, as if the external memory were added.

Here has been described the hard disk, but the present invention can likewise be applied to a data reproducing device for reproducing data recording disks such as the CD or DVD. Specifically, what is structurally different between the hard disk and the data reproducing device of this kind resides only in whether the data storing disc can be freely exchanged. Therefore, the data reproducing device has a construction basically identical to that shown in FIG. 3.

Here in the data reproducing device and the hard disk according to the present invention, the aforementioned reproduce/record control unit may be replaced by a reproduce control unit for reproducing the program, which has been recorded in the region over the substrate of the data storing disk other than the data storage region, through the magnetic head at the time of reproducing the data from the other region.

The data storing disk according to the present invention may be any, so long as the program is magnetically recorded in advance in the region over the substrate other than the data storage region. For example, there arises no problem, if a new program or data cannot be recorded/reproduced later in/from that other region.

[Effects of the Invention]

In the case of the data reproducing device according to Aspect 1 of the present invention, as has been described hereinbefore, the copy protection information is written as the surface shape such as the slits or corrugations in the pre-recording region over the data storing disk and is read by the pickup unit. As compared with the case of the prior art, therefore, it is less possible that the key information is unlawfully stolen so that the unlawful copy is hard to make in this respect. Moreover, it is not only possible to omit the memory, as stored with the copy protection information, although needed in the prior art, but also easy to produce the disks massively. In these respects, the cost can be lowered.

In the case of the hard disk according to Aspect 2 of the present invention, the fundamental construction is made identical to that of the data reproducing device of Aspect 1 so that effects similar to those of Aspect 1 can be obtained.

In the case of the data storing disk according to Aspect 3 or 4 of the present invention, the secret information is written in advance as the surface shape such as the slits or corrugations in the region over the substrate other than the data storage region. Therefore, it is not only possible to omit the memory, as stored with the secret information, but also easy to produce the disks massively. In these respects, the cost can be lowered. Therefore, a merit is obtained in the cost.

In the case of the data reproducing device according to Aspect 5 of the present invention, the program is magnetically recorded in the region over the substrate of the disk other than the data storage region and can be reproduced. For the user, therefore, the user-friendly function can be easily realized by using the program properly. Unlike the prior art, it is unnecessary to purchase a software separately and to use any special external memory. This unnecessariness makes the data reproducing device drastically economical.

In the case of the data reproducing device according to Aspect 6 of the present invention, not only the program is magnetically recorded in advance in the region over the substrate of the disk other than data storage region, but also a new program or data can be recorded/reproduced later in that other region. For the user, therefore, it is possible to erase the unnecessary one of the programs recorded in advance and to record and use the new program and data. The same result is significantly obtained, as if the external memory were added.

In the case of the hard disk according to Aspect 7 or 8 of the present invention, merits similar to those of the case of Aspect 5 or 6 can be obtained.

In the case of the data storing disk according to Aspect 9 of the present invention, this data storing disk can be used in the data reproducing device according to Aspect 5 or in the data reproducing device according to Aspect 7 so that merits similar to those of the case of Aspect 5 or 6 can be obtained.

In the case of the data storing disk according to Aspect 10 of the present invention, this data storing disk can be used in the data reproducing device according to Aspect 6 or in the data reproducing device according to Aspect 8 so that merits similar to those of the case of Aspect 6 or 8 can be obtained.

What is claimed is:

1. A data reproducing device for reproducing data recorded in a data storing disk,
said data reproducing device comprising:
a pickup unit for reading a copy protection information which is written in advance as slits and holes in a region over a substrate of said data storing disk other than a data storage region; and
a copy protection unit adapted, when an encrypted data over the data storage region of said data storing disk is copied in response to a demand of an external device, to perform an authentication with reference to the copy protection information read by said pickup unit thereby to output the information, as contained in the copy protection information and relating to a secret information containing a secret key, to the external device which is recognized to be correct through the authentication,
the secret information is written in advance as slits and holes, in the region over the substrate other than the data storage region, in order to allow emitted light to pass through the slits and holes and be received by a receiving diode and output as electrical signals to the copy protection unit.

2. The data storing disk used in the data reproducing device according to claim 1, wherein
a program is magnetically recorded in the region over the substrate other than the data storage region.

3. The data storing disk according to claim 2, wherein the secret information is the copy protection information.

4. The data storing disk according to claim 2, wherein a program or data is capable of being magnetically recorded/reproduced in/from the region over the substrate other than the data storage region.

5. A hard disk comprising:
a disk having a copy protection information written in advance as slits and holes in a pre-recording region over a substrate other than a data storage region;
a pickup unit for reading the copy protection information over said disk; and
a copy protection unit adapted, when an encrypted data over the data storage region of said data storing disk is copied in response to a demand of an external device, to perform an authentication with reference to the copy protection information read by said pickup unit thereby to output the information, as contained in the copy protection information and relating to a secret information containing a secret key, to the external device which is recognized to be correct through the authentication,
the secret information is written in advance as slits and holes, in the region over the substrate other than the data storage region, in order to allow emitted light to pass through the slits and holes and be received by a receiving diode and output as electrical signals to the copy protection unit.

6. The data storing disk used in the hard disk according to claim 5, wherein
a program is magnetically recorded in the region over the substrate other than the data storage region.

7. The data storing disk according to claim 6, wherein the secret information is the copy protection information.

8. The data storing disk according to claim 6, wherein a program or data is capable of being magnetically recorded/reproduced in/from the region over the substrate other than the data storage region.

9. A hard disk according to claim 5, wherein general-purpose application software matching the external device can be recorded in advance in the pre-recording region of the disk.

10. A data reproducing device for reproducing data recorded in a data storing disk, comprising:
a magnetic head for reading a program which is magnetically recorded in advance in the region over a substrate of a data storing disk other than a data storage region; and
a reproduce control unit for reproducing the program recorded in the region in response to a demand of an external device, through the magnetic head at the time of reproducing the data from the region over the substrate of said data storing disk other than the data storage region, to perform an authentication thereby to output a secret information containing a secret key, to the external device which is recognized to be correct through the authentication, the secret information is written in advance as slits and holes, in the region over the substrate other than the data storage region, in order to allow emitted light to pass through the slits and holes and be received by a receiving diode and output as electrical signals to the reproduce control unit.

11. A data reproducing device for reproducing data recorded in a data storing disk, compromising:

a magnetic head for reading a program which is magnetically recorded in advance in a region over a substrate of a data storing disk other than a data storage region; and a reproduce/record control unit for reproducing the program recorded in the region in response to a demand of an external device, through said magnetic head at a time of reproducing the data from the region over the substrate of said data storing disk other than the data storage region, and for recording a program or data in the region through said magnetic head at a data recording time, to perform an authentication thereby to output a secret information containing a secret key, to the external device which is recognized to be correct through the authentication, the secret information is written in advance as slits and holes, in the region over the substrate other than the data storage region, in order to allow emitted light to pass through the slits and holes and be received by a receiving diode and output as electrical signals to the reproduce/record control unit.

12. The data storing disk according to any one of claims 1, 10 and 11, wherein the secret information is the copy protection information.

13. The data storing disk according to any one of claims 1, 10 and 11, wherein a program or data is capable of being magnetically recorded/reproduced in/from the region over the substrate other than the data storage region.

14. A hard disk comprising:

a disk having a program magnetically recorded in advance in the region over a substrate other than a data storage region;

a magnetic head for reading the program which is recorded in the region over said disk; and a reproduce control unit for reproducing the program recorded in the region in response to a demand of an external device, through said magnetic head at a time of reproducing the data from the region over the substrate of said disk other than the data storage region, to perform an authentication thereby to output a secret information containing a secret key, to the external device which is recognized to be correct through the authentication, the secret information is written in advance as slits and holes, in the region over the substrate other than the data storage region, in order to allow emitted light to pass through the slits and holes and be received by a receiving diode and output as electrical signals to the reproduce control unit.

15. A hard disk comprising:

a disk having a program magnetically recorded in advance in a region over a substrate other than a data storage region;

a magnetic head for reading the program which is recorded in the region over said disk; and a reproduce/record control unit for reproducing the program recorded in the region in response to a demand of an external device, through said magnetic head at a time of reproducing the data from the region over the substrate of said disk other than the data storage region, and for recording a program or data in the region through said magnetic head at a data recording time, to perform an authentication thereby to output a secret information containing a secret key, to the external device which is recognized to be correct through the authentication, the secret information is written in advance as slits and holes, in the region over the substrate other than the data storage region, in order to allow emitted light to pass through the slits and holes and be received by a receiving diode and output as electrical signals to the reproduce/record control unit.

16. The data storing disk according to any one of claims 5, 14 and 15, wherein the secret information is the copy protection information.

17. The data storing disk according to any one of claims 5, 14 and 15, wherein a program or data is capable of being magnetically recorded/reproduced in/from the region over the substrate other than the data storage region.

* * * * *